United States Patent
Kamhi et al.

(10) Patent No.: US 11,138,796 B2
(45) Date of Patent: *Oct. 5, 2021

(54) SYSTEMS AND METHODS FOR CONTEXTUALLY AUGMENTED VIDEO CREATION AND SHARING

(71) Applicant: INTEL CORPORATION, Santa Clara, CA (US)

(72) Inventors: Gila Kamhi, Zichron Yaakov (IL); Barak Hurwitz, Kibbutz Alonim (IL); Vladimir Kouperman, Haifa (IL); Kobi Nistel, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/546,071

(22) Filed: Aug. 20, 2019

(65) Prior Publication Data
US 2019/0385374 A1    Dec. 19, 2019

Related U.S. Application Data

(63) Continuation of application No. 15/689,274, filed on Aug. 29, 2017, now Pat. No. 10,417,828, which is a (Continued)

(51) Int. Cl.
*G06T 19/00* (2011.01)
*G06K 9/00* (2006.01)

(52) U.S. Cl.
CPC ........ *G06T 19/006* (2013.01); *G06K 9/00671* (2013.01)

(58) Field of Classification Search
None
See application file for complete search history.

(56) References Cited

U.S. PATENT DOCUMENTS

| | | | |
|---|---|---|---|
| 8,405,680 B1 * | 3/2013 | Cardoso Lopes | G06T 19/00 345/426 |
| 2007/0110298 A1 * | 5/2007 | Graepel | A63F 13/213 382/154 |

(Continued)

OTHER PUBLICATIONS

Mendes, Daniel, Pedro Lopes, and Alfredo Ferreira. "Hands-on interactive tabletop lego application." In Proceedings of the 8th International Conference on Advances in Computer Entertainment Technology, pp. 1-8. Nov. 8, 2011. (Year: 2011).*

(Continued)

*Primary Examiner* — Steven Z Elbinger
(74) *Attorney, Agent, or Firm* — Schwabe, Williamson & Wyatt, P.C.

(57) ABSTRACT

An augmented reality (AR) device includes a 3D video camera to capture video images and corresponding depth information, a display device to display the video data, and an AR module to add a virtual 3D model to the displayed video data. A depth mapping module generates a 3D map based on the depth information, a dynamic scene recognition and tracking module processes the video images and the 3D map to detect and track a target object within a field of view of the 3D video camera, and an augmented video rendering module renders an augmented video of the virtual 3D model dynamically interacting with the target object. The augmented video is displayed on the display device in real time. The AR device may further include a context module to select the virtual 3D model based on context data comprising a current location of the augmented reality device.

20 Claims, 5 Drawing Sheets

Related U.S. Application Data continuation of application No. 14/581,468, filed on Dec. 23, 2014, now Pat. No. 9,754,416.

(56) References Cited

U.S. PATENT DOCUMENTS

| | | |
|---|---|---|
| 2009/0259648 A1 | 10/2009 | Bokor et al. |
| 2010/0011312 A1* | 1/2010 | Banerjee ............ G06Q 50/02 715/772 |
| 2011/0134026 A1 | 6/2011 | Kang et al. |
| 2012/0162254 A1 | 6/2012 | Anderson et al. |
| 2012/0165096 A1* | 6/2012 | Geisner ............ G06F 3/017 463/36 |
| 2013/0083011 A1* | 4/2013 | Geisner ............ G02B 27/017 345/419 |
| 2013/0083018 A1 | 4/2013 | Geisner et al. |
| 2013/0271491 A1 | 10/2013 | Anderson |
| 2013/0307875 A1 | 11/2013 | Anderson |
| 2014/0028850 A1 | 1/2014 | Keating et al. |
| 2014/0068526 A1 | 3/2014 | Figelman et al. |
| 2014/0094200 A1 | 4/2014 | Schatzberg et al. |
| 2014/0267397 A1* | 9/2014 | Wagner ............ G06T 7/74 345/633 |
| 2014/0267404 A1 | 9/2014 | Mitchel et al. |
| 2014/0267598 A1 | 9/2014 | Drouin et al. |
| 2014/0306994 A1 | 10/2014 | Brown et al. |
| 2014/0306995 A1 | 10/2014 | Raheman et al. |
| 2014/0323213 A1 | 10/2014 | Wakeford et al. |
| 2015/0062120 A1* | 3/2015 | Reisner-Kollmann ............ G06T 19/006 345/419 |
| 2015/0085155 A1 | 3/2015 | Diaz Spindola et al. |
| 2015/0123966 A1 | 5/2015 | Newman |
| 2015/0262426 A1 | 9/2015 | Marner et al. |
| 2015/0279101 A1 | 10/2015 | Anderson |

OTHER PUBLICATIONS

Song, Peng, Hang Yu, and Stefan Winkler. "Vision-based 3D finger interactions for mixed reality games with physics simulation." In Proceedings of the 7th ACM SIGGRAPH international conference on virtual-reality continuum and its applications in industry, pp. 1-6. Dec. 8, 2008. (Year: 2008).*
U.S. Appl. No. 14/581,468, Notice of Allowance, dated May 17, 2017.
U.S. Appl. No. 14/581,468, Non-Final Office Action, dated May 6, 2016, 36 pages.
U.S. Appl. No. 14/581,468, Final Office Action, dated Oct. 14, 2016, 24 pages.
U.S. Appl. No. 15/689,274, Non-Final Office Action, dated Jan. 10, 2019, 27 pages.
U.S. Appl. No. 15/689,274, Notice of Allowance, dated May 8, 2019, 12 pages.
U.S. Appl. No. 15/689,274, Non-Final Office Action, dated Aug. 23, 2018, 15 pages.
Aurasma, "Auras", http://www.aurasma.com/aura, Aug. 14, 2014, 2 pages.
Metaio, "Metaio Creator", http://www.metaio.com/creator, Aug. 14, 2014, 2 pages.
Total Immersion, "D'Fusion Studio Suite", http://www.t-immersion.com/products/dfusion-suite, Aug. 14, 2014, 2 pages.
Wikitude Studio, "Create, Manage and Publish!", http://www.wikitude.com/products/studio/, Aug. 14, 2014, 5 pages.
Wikitude Studio, "The world's easiest augmented reality creation tool!", http://studio.wikitude.com, Aug. 14, 2014, 1 page.

* cited by examiner

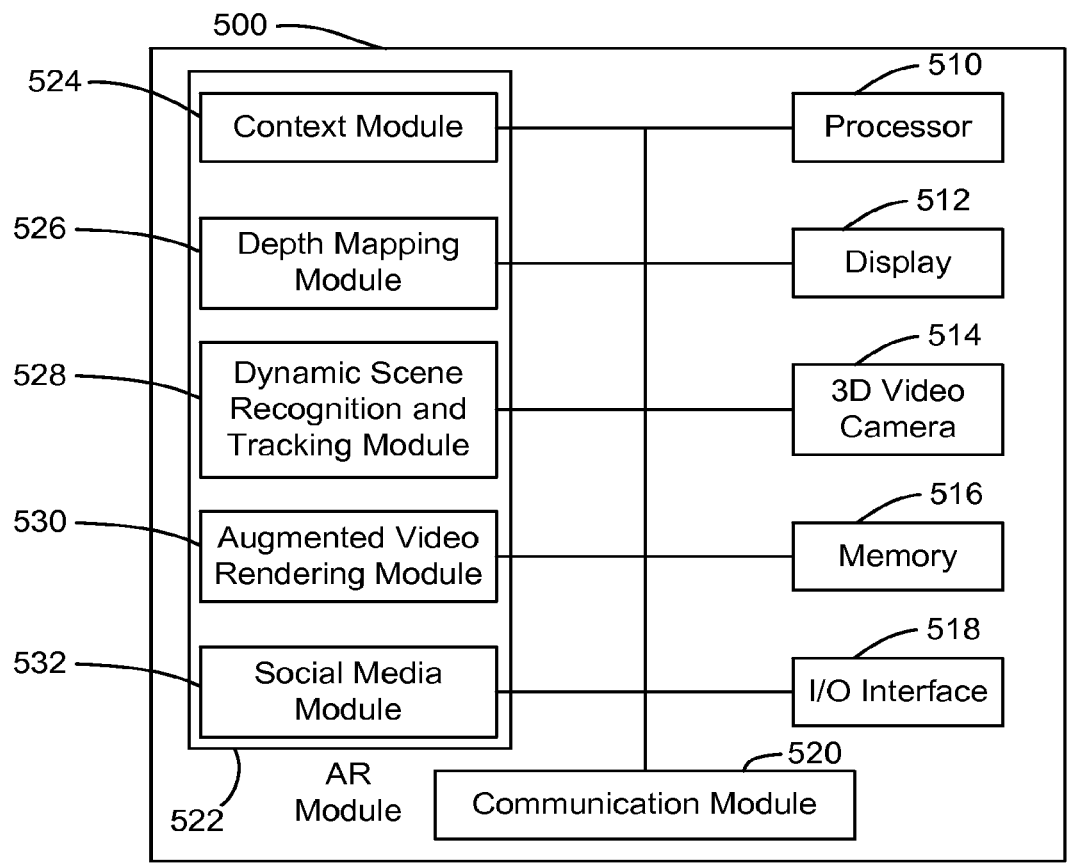
FIG. 5
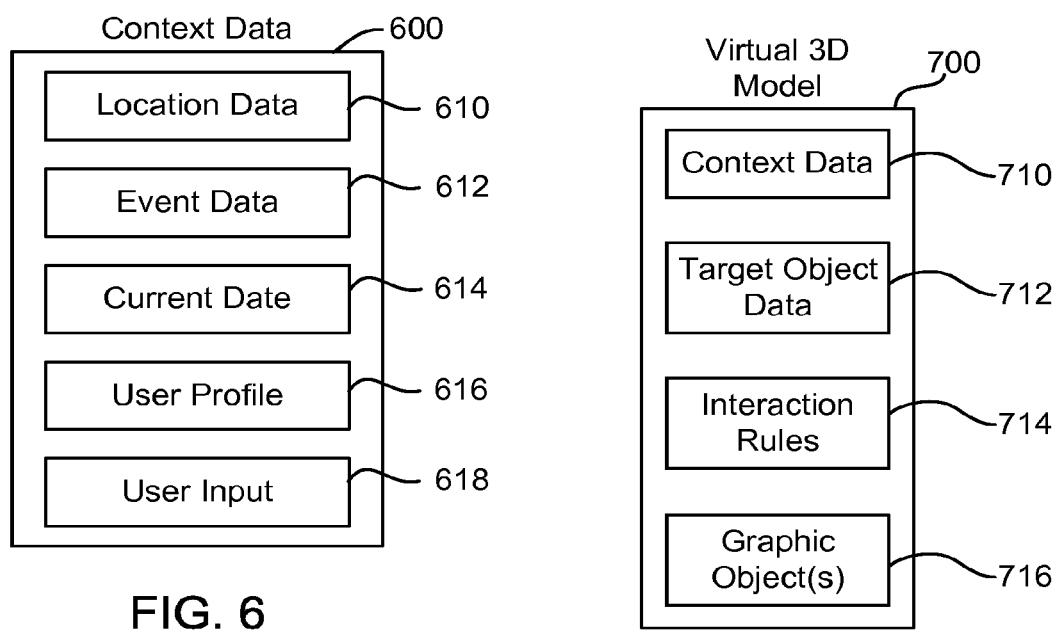
FIG. 6
FIG. 7

SYSTEMS AND METHODS FOR CONTEXTUALLY AUGMENTED VIDEO CREATION AND SHARING

CROSS-REFERENCE(S) TO RELATED APPLICATIONS

This application is a continuation of U.S. patent application Ser. No. 15/689,274, filed Aug. 29, 2017, which is a continuation of U.S. patent application Ser. No. 14/581,468, filed Dec. 23, 2014, each of which is incorporated by reference herein in its entirety.

TECHNICAL FIELD

This disclosure relates generally to augmented reality video.

BACKGROUND

With the emergence of video software applications (apps) for mobile devices, there is a movement toward real-time video sharing. Online mobile photo-sharing and video-sharing services have grown rapidly in recent years. With social media services that allow about 3-15 seconds per video (i.e., a "micro" video), users are even more likely to create and share videos from their smartphones and tablets.

Generally, augmented reality systems insert virtual characters or objects into real-world images, for example by overlaying a captured image or video stream with a two-dimensional (2D) or three-dimensional (3D) animated rendering of the virtual character. In one example, augmented reality is used to superimpose virtual people or animals over a video feed of a real scene. In some cases, the real scene is observed on a display device of a camera and a person standing in the scene can then make gestures that provide interactivity between the real person and the virtual person or animal, as observed by the camera. This interaction between the real person and the virtual person cannot be seen directly by the real person, but can be observed through a display that shows the augmented reality view. This view includes the real scene, the real person, and the virtual person.

BRIEF DESCRIPTION OF THE DRAWINGS

FIG. 5 is a block diagram of an augmented reality device according to one embodiment.

FIG. 6 is a block diagram a data structure for context data according to one embodiment.

FIG. 7 is a block diagram of a virtual 3D model according to one embodiment.

DETAILED DESCRIPTION OF PREFERRED EMBODIMENTS

Figure 1:
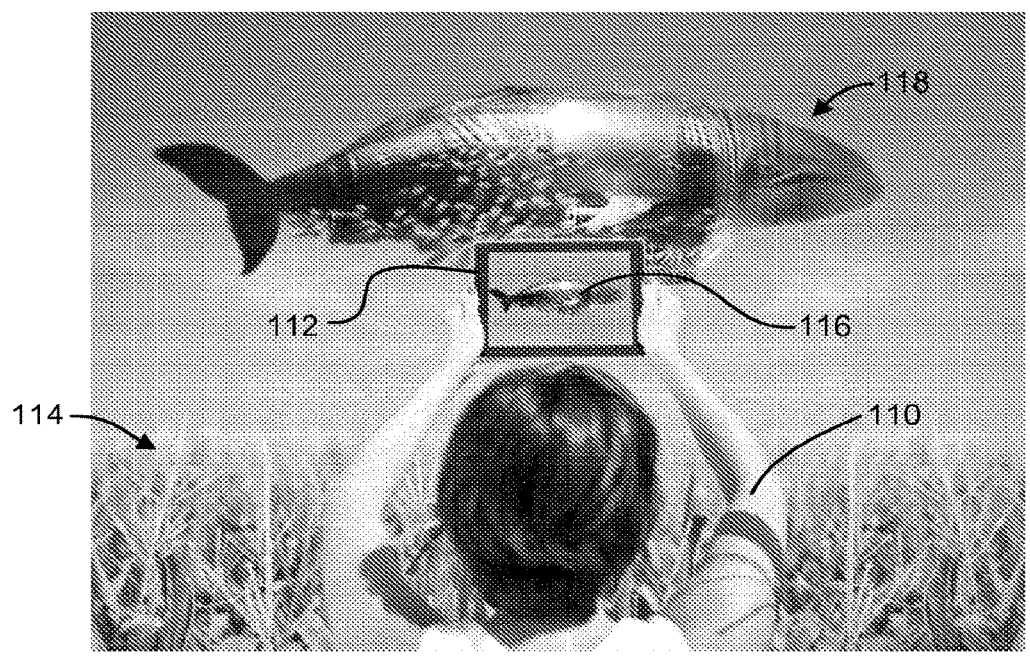
FIG. 1 graphically represents an example of augmented reality according to one embodiment.

Systems and methods disclosed herein use depth information from a 3D camera to detect an object (e.g., person, animal, building, vehicle, toy, etc.) in a video and to render an augmented reality video in real time that includes a virtual 3D model dynamically interacting with the detected object. In certain embodiments, a mobile device includes a red/green/blue (RGB)-depth camera (RGB-D camera) and an augmented reality module (AR module) that selects a virtual 3D model based on context information, such as a location of a user. The user may, for example, use the mobile device to capture short video clips while selected virtual 3D models come to life and interact with the reality in the field of view of the RGB-D camera. Thus, the mobile device with RGB-D camera can automatically produce augmented micro video clips that may be shared with a user's friends in a social circle. By way of contrast with the embodiments disclosed herein, the usefulness of devices that use 2D cameras, or that do not analyze or use depth information, limit the degree of dynamic interaction between the real objects in the scene and virtual objects inserted into the scene.

In certain embodiments, the mobile device may include, for example, a smartphone, a cellular phone, a handset, a tablet computer, a laptop computer, a notebook computer, a gaming device, a messaging device, a music player, a digital camera, a digital video recorder, a consumer electronic device, or other portable device. The RGB-D camera of the mobile device includes a sensing system that captures RGB video images along with per-pixel depth information. The AR module of the mobile device generates a 3D map of the environment and applies a virtual 3D model to the 3D map. The virtual 3D model may include a single virtual 3D object or a plurality of virtual 3D objects. The AR module tracks frame-by-frame changes in the 3D map and adapts the virtual 3D model to dynamically interact with detected objects in the scene.

The RGB-D camera and AR module allow the mobile device to create instant contextual video clips that can be shared by the user. Contextual augmentation embodiments based on a user's location may allow the mobile device to access virtual 3D models from a local database or an online store that is adaptive to the user's location. For example, virtual 3D models of historic people or objects may be automatically selected or suggested to the user based on the user's location (e.g., virtual 3D models of historic people related to the construction of Louvre may be automatically selected or suggested to the user when a micro video clip is captured in the vicinity of Louvre). Other context data may also be used to select or suggest virtual 3D models, such as such as environment information (e.g., urban vs. rural setting) and/or user profiles (e.g., indicating a birthday, preferences, and/or other user data).

In certain embodiments, the creation of an augmented video clip is very easy and is triggered only by the detection of people and objects in the scene. In other words, augmentation and viewing of the augmented world does not require a pre-scan of the environment or a recognition of a marker placed in the environment, as certain other augmented reality applications require.

In certain embodiments, the virtual 3D models may be programmed or configured to appear to be fully aware of people and/or other scene elements by using 3D depth based scene analysis, user recognition, video segmentation, photo-realistic rendering (e.g., occlusion), and/or other video processing techniques. Thus, the virtual 3D objects do not appear to be fixed or "glued" to the reality. The borders of real and virtual worlds are blurred as the virtual characters interact with the scene and people in the field of view of the camera in a photo-realistic manner. For example, a virtual 3D model may include a virtual monkey that climbs on the shoulder of a person in the field of view of the camera, and the virtual monkey continues its way climbing on the person's head and reacting to the person's movements. Other examples are provided in the detailed discussion below.

The usefulness of devices that use 2D cameras, or that do not analyze or use depth information, limit the degree of dynamic interaction between the real objects in the scene and virtual objects inserted into the scene. Mobile augmented reality systems that use a 2D camera do not provide photo-realistic rendering and interaction of virtual 3D objects with real world objects or people in an automatic manner that leverages a 3D camera's capability to sense, understand, and interpret the real 3D world. By way of contrast with previous augmented reality systems, certain embodiments disclosed herein generate micro-clips of dynamically changing scenes using depth information for a realistic rendering of virtual objects into the reality. The virtual objects are animated based on models that are aware of the depth of the real objects and their functionality and/or behavior.

Further, certain available augmented reality media creation solutions provide for the creation by the user of an application that augments the reality with pre-defined objects and enables the user to view the augmented reality from different viewpoints. The augmentation may be triggered by the detection of a predetermined object at a predetermined location. Such solutions include augmented media creation tools that are not easy to use, are not part of a consumer application, and are not packaged as part of a mobile device such as a smartphone or tablet with a 3D camera. In other words, such solutions create an application rather than media to be shared with friends or asocial circles. By way of contrast with such solutions, certain embodiments disclosed herein make virtual 3D objects available based on the location, rather than triggers based on object recognition. Thus, such embodiments using location based availability of virtual 3D models may allow third parties such as stores, restaurants, government organizations, historical organizations, etc. to easily provide tailored virtual 3D models to users without requiring the users to pre-scan an area in search of triggers using advanced computer vision based 3D object recognition technology.

In one embodiment, an augmented reality system provides a user with an ability to capture augmented micro video clips. For example, a user may hold a tablet or smartphone with a world facing 3D camera (RGB-D) and capture video clips of what the user sees, while having the freedom to choose the virtual 3D model that will be included as part of the reality that the user experiences. Augmentation is triggered with respect to a person and/or object detected in the scene, without use of a recognition marker. The system renders dynamic virtual objects into the scene in the camera's field of view in a photo-realistic manner. The video capture includes augmentation that is aware of the user and the objects in the scene (e.g., using occlusion and natural interaction with the user and the objects in the user's environment in real-time). Access of virtual 3D models is based on user location information that is relevant for micro video clip capture. The 3D virtual models interact with the user or objects in the scene based on the movements, mood, and/or speech.

In one embodiment, a method for generating contextually augmented video includes starting a video clip capture and selecting from a group of virtual 3D models that are proposed based on location, user mood, and/or user profile (e.g., birthday, anniversary, etc.). The virtual 3D models include animations that may be automatically adapted to location, size, light, etc. The method further includes detecting people and objects in the scene and tracking skeleton and coarse gestures based on depth information, blob detection, and basic scene depth detection. The method uses the depth information to render the virtual 3D model in a photorealistic manner that supports occlusion. Thus, there is no need for a marker to be pre-located in the real scene. The method augments the real people and objects in sync with their real-time dynamic positions based on their movements (e.g., virtual butterflies follow the gestures of the people in the field of view of the world facing camera).

Example embodiments are described below with reference to the accompanying drawings. Many different forms and embodiments are possible without deviating from the spirit and teachings of the invention and so the disclosure should not be construed as limited to the example embodiments set forth herein. Rather, these example embodiments are provided so that this disclosure will be thorough and complete, and will convey the scope of the invention to those skilled in the art. In the drawings, the sizes and relative sizes of components may be exaggerated for clarity. The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween.

FIG. 1 graphically represents an example of augmented reality according to one embodiment. In this example, a user 110 starts an AR module (not shown) on a handheld device 112 (e.g., computer tablet) and is presented with a suggested list of virtual 3D models. The list may be based on the user's location, mood, and/or user profile. For example, if the AR module determines that the user 110 is located in corn field that appears as a "sea" of corn stalks 114, and that the user 110 is in a playful mood, the list may include a virtual 3D model comprising a "flying whale" configured to playfully dive in and out of the corn stalks 114. After selecting the virtual 3D model from the list, the user 110 captures a micro video clip by positioning a world facing 3D camera of the handheld device 112 (e.g., tablet) to a view of interest (e.g., an area in and above the corn field). The AR module displays a virtual image 116 of the flying whale on a screen of the handheld device 112. The virtual image 116 of the flying whale blends into the user's environment and flies in the 3D camera's field of view as if part of the user's real environment. Those skilled in the art will recognize from the disclosure herein that unlike the user 110 shown in FIG. 1, the whale image 118 does not actually exist in the surrounding environment. Rather, the whale image 118 is shown in FIG. 1 to represent the augmented reality experienced by the user 110 when viewing a video of the virtual image 116 of the flying whale through the screen on the handheld device 112.

Figure 2:
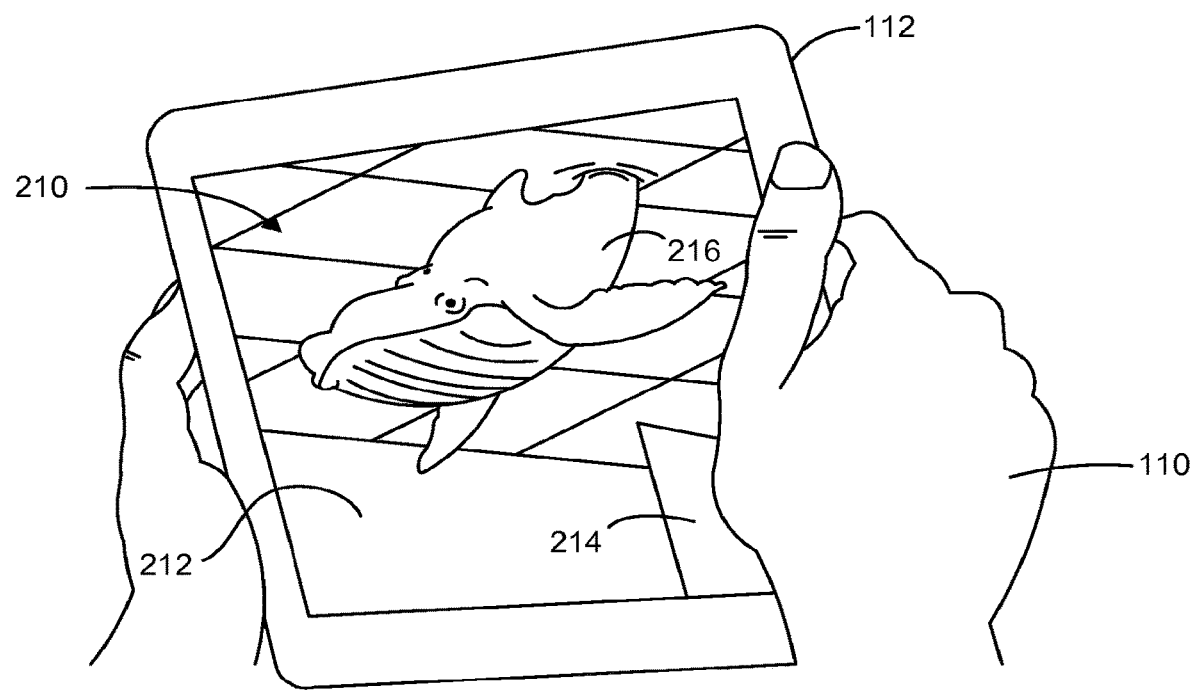
FIG. 2 illustrates another example of augmented reality according to one embodiment.

FIG. 2 illustrates another example of augmented reality according to one embodiment. In this example, the user 110 is indoors and points the 3D camera of the handheld device 112 toward the ceiling so as to view ceiling tiles 210, a wall 212, and a beam 214 in a room. Based on depth information from the 3D camera, the AR module displays a virtual 3D model 216 (e.g., a whale) emerging from the ceiling tiles 210. After swimming around the room, the AR module may then, for example, show the whale disappearing through the wall 212 or beam 214. The depth information allows photo-realistic rendering of virtual 3D models in the micro-video capture. As the user 110 captures the video clip, the augmentation is rendered in a photo-realistic manner aware of the physical scene.

Figure 3A:
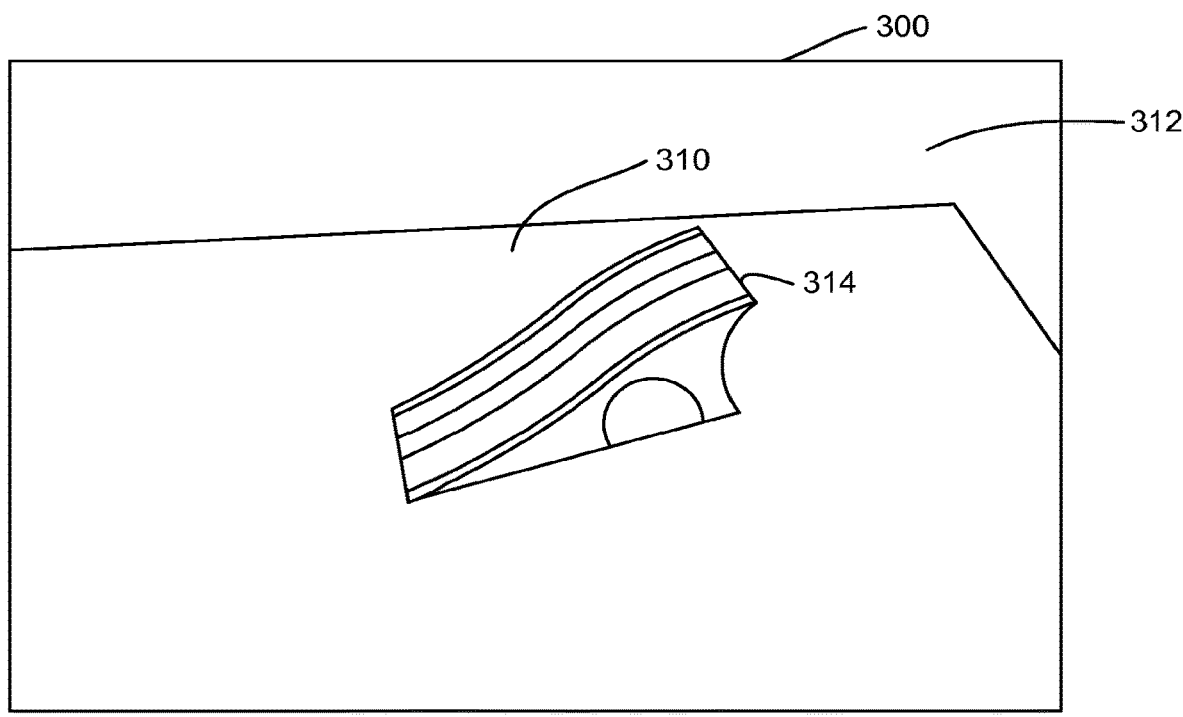
FIGS. 3A and 3B illustrate an example of virtual augmentation of a 3D scene according to one embodiment.
Figure 3B:
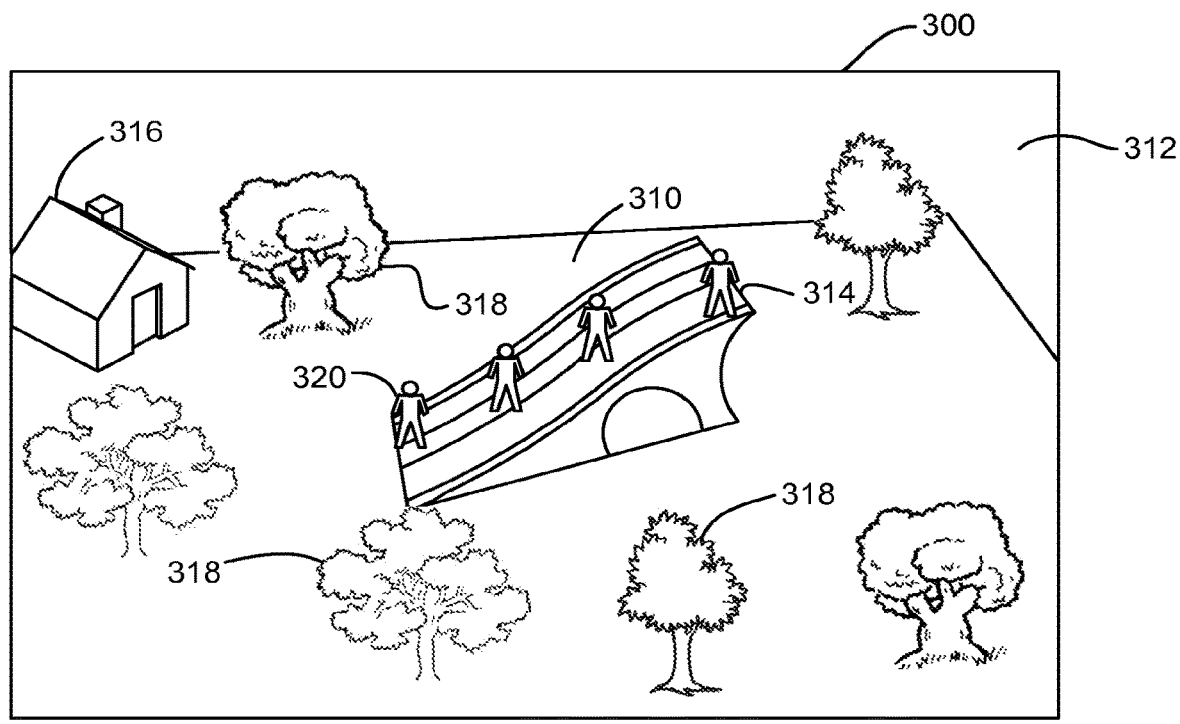

FIGS. 3A and 3B illustrate an example of virtual augmentation of a 3D scene according to one embodiment. FIG. 3A illustrates a display screen 300 of a mobile device showing a video of a portion of a table top 310, a wall 312 beyond the table top 310, and a toy ramp 314 resting on the table top 310. FIG. 3B illustrates the display screen 300 showing an augmented video of a 3D virtual environment with a virtual house 316, virtual trees 318, and virtual people 320 rendered into the reality of the user in a photo-realistic manner. Based on the depth information provided by the 3D camera, the edges or boundaries of the table top 310 and the toy ramp 314 are identified. The virtual 3D model uses the identified edges and boundaries to interact with the 3D scene. For example, the virtual people 320 walk or climb up the toy ramp 314 and virtual scenery such as the virtual house 316 and virtual trees 318 spread only on the table.

Although in this example the table top 310 and toy ramp 314 are static (not moving with respect to one another), the user may move the mobile device such that the field of view shown on the display screen 300 shows different portions of the table top 310 and/or different views (e.g., from different angles) of the toy ramp 314. The virtual 3D model dynamically adjusts to the changes in the scene shown on the display screen 300 (e.g., by showing different views of the virtual 3D objects and/or additional 3D virtual objects, such as additional virtual trees 318, on newly displayed portions of the table top 310).

Unlike the static environment shown in FIG. 3A, dynamically changing environments may include moving objects. Thus, certain embodiments provide seamless photo-realistic interaction of virtual 3D objects with dynamic real scenery in the field of view of a video capture device (e.g., world facing RGB-D camera). For example, people in a scene may be outlined (e.g., using video segmentation) and tracked, and virtual 3D objects configured to follow and interact with the people in the scene.

Figure 4A:
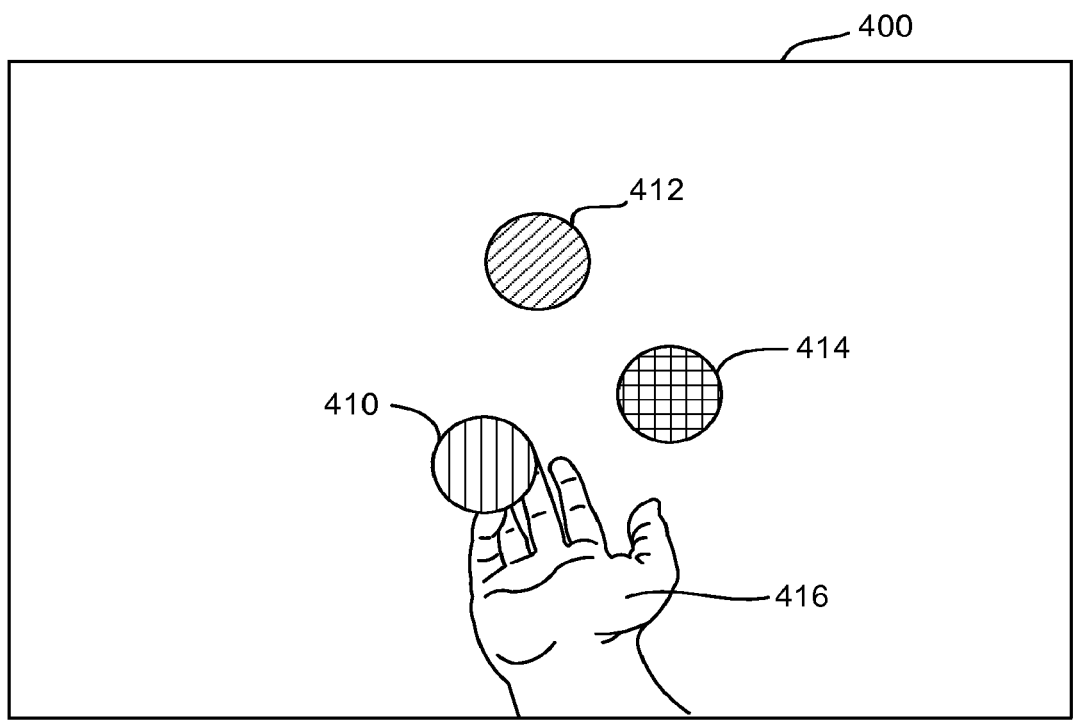
FIGS. 4A and 4B illustrate an example of virtual augmentation of a dynamically changing scene according to one embodiment.
Figure 4B:
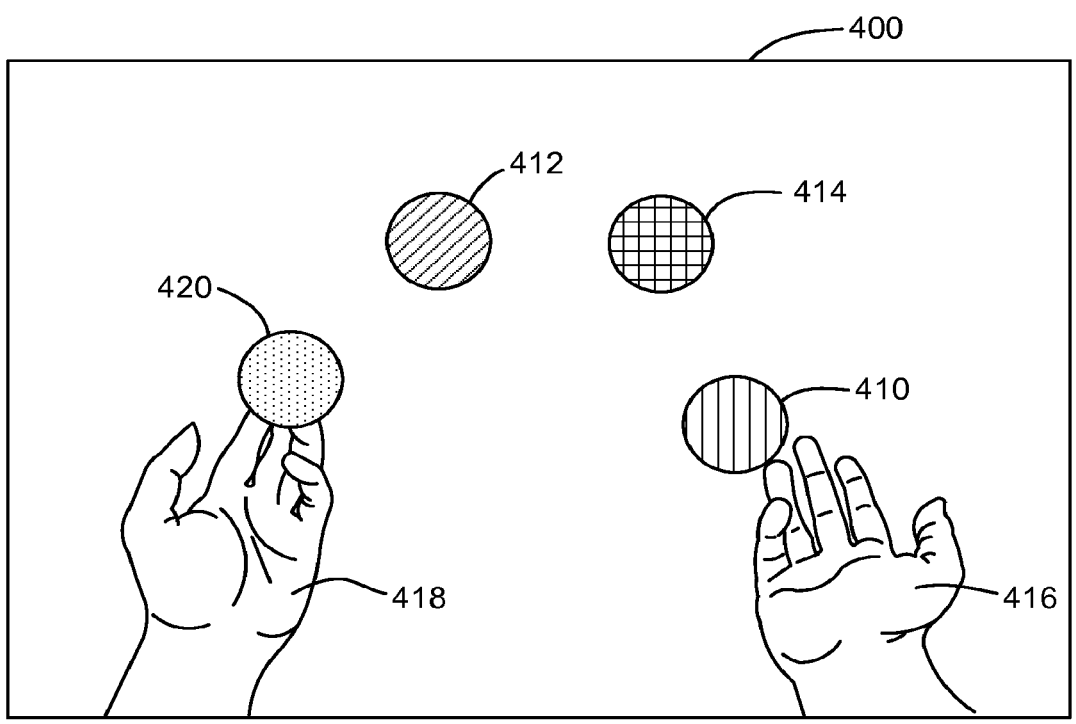

FIGS. 4A and 4B illustrate an example of virtual augmentation of a dynamically changing scene according to one embodiment. FIG. 4A illustrates a display screen 400 of a mobile device showing an augmented video of three virtual balls 410, 412, 414 being virtually juggled by following the gestures of a user's hand 416. In this example, the balls 410, 412, 414 follow the user's hand 416 as it moves left, right, up, and/or down within the 3D camera's field of view, as shown on the display screen 400. As shown in FIG. 4B, when the user places a second hand 418 within the 3D camera's field of view, the virtual 3D model reacts by changing its behavior to interact with both hands 416, 418. For example, a fourth virtual ball 420 is displayed and the interaction changes from virtually juggling with one hand 416 to virtually juggling the four virtual balls 410, 412, 414, 420 between both hands 416, 418.

The examples shown in FIGS. 1, 2, 3A, 3B, 4A, and 4B include the use of a world facing 3D camera where the objective lens of the camera is located on one side of a mobile device and the display screen is located on another (e.g., opposite) side of the mobile device. User facing (selfie mode) 3D cameras can also be used, according to certain embodiments where the objective lens of the camera and the display screen are located on the same side of the mobile device. With a user facing 3D camera, users can experience augmented interaction with themselves in real-time at the time of the video capture.

FIG. 5 is a block diagram of an augmented reality device 500 according to one embodiment. The augmented reality device 500 may be embodied as any type of device configured to render one or more augmented reality objects or otherwise perform the functions described herein, including, without limitation, a smartphone, a cellular telephone, a handset, a tablet computer, a laptop computer, a notebook computer, a messaging device, a gaming device, a smart appliance, a network appliance, a web appliance, a multiprocessor system, and/or a mobile consumer electronic device. The augmented reality device 500 includes a processor 510, a display device 512, a 3D video camera 514, a memory device 516, an input/output (I/O) interface 518, a communication module 520, and an augmented reality (AR) module 522. Those skilled in the art will recognize from the disclosure herein that the augmented reality device 500 may include fewer components, or additional components such as those commonly found in a smartphone or tablet computer (e.g., various sensors and I/O devices). Further, in certain embodiments, one or more of the illustrated components may be incorporated in, or otherwise form a portion of, another component. For example, the memory device 516, or portions thereof, may be incorporated in the processor 510.

The processor 510 may include any type of processor capable of performing the functions described herein. For example, the processor 510 may include a single or multi-core processor(s), digital signal processor, microcontroller, or other processor or processing/controlling circuit. Similarly, the memory device 516 may include any type of volatile or non-volatile memory or data storage capable of performing the functions described herein. In operation, the memory device 516 may store various data and software used during operation of the augmented reality device 500 such as operating systems, applications, programs, libraries, and drivers. The memory device 516 may also permanently or temporarily store data associated with captured images or video as well as data associated with virtual objects or models.

The I/O interface 518 may include circuitry and/or components to facilitate input/output operations with the processor 510, the memory device 516, and other components of the augmented reality device 500. For example, the I/O interface 518 may include memory controller hubs, input/output control hubs, firmware devices, communication links (e.g., point-to-point links, bus links, wires, cables, light guides, printed circuit board traces, etc.) and/or other components and subsystems to facilitate the input/output operations. In some embodiments, the I/O interface 518 may form a portion of a system-on-a-chip (SoC) and be incorporated, along with the processor 510, the memory device 516, and other components of the augmented reality device 500, on a single integrated circuit chip.

The display device 512 may include any type of display capable of displaying digital information such as a liquid crystal display (LCD), a light emitting diode (LED), a plasma display, a cathode ray tube (CRT), or other type of display device. In some embodiments, the display device 512 may be coupled to a touch screen to allow user interaction with the augmented reality device 500. The communication module 520 may include any communication circuit, device, or collection thereof, configured to enable communications between the augmented reality device 500 and other remote devices over a communication network. The communication module 520 may be configured to use one or more communication technology (e.g., wireless or wired communications) and associated protocols (e.g., 3G, LTE, Bluetooth®, Wi-Fi®, WiMAX, etc.) to effect such communication.

The 3D video camera 514 is configured to capture images and depth information of the environment of the augmented reality device 500 including, in some embodiments, capturing still images or video images. In certain embodiments, the 3D video camera 514 includes an RGB-D camera comprising a sensing system that captures color (RGB) video images along with per-pixel depth information. In other embodiments, the 3D video camera 514 may include separate digital video camera and depth sensors. In addition to the 3D video camera 514, certain embodiments of the augmented reality device 500 include a digital camera or other digital imaging device comprising an electronic image sensor, such as an active-pixel sensor (APS), e.g., a complementary metal-oxide-semiconductor (CMOS) sensor, or a charge-coupled device (CCD).

The AR module 522 is configured to generate augmented video, as described in various embodiments herein. In certain embodiments, the AR module 522 is configured to trigger augmentation in response to detecting a person and/or object in the scene (e.g., in video provided by the 3D video camera 514). In other words, the AR module 522 does not require the recognition of a marker. The AR module 522 renders a dynamic virtual object into the scene in the field of view of the 3D video camera 522 in a photo-realistic manner. The video capture includes augmentation that is aware of the user and the objects in the scene (e.g., providing occlusion and natural interaction with the user and the objects in the user's environment in real-time). The AR module 522 includes a context module 524, a depth mapping module 526, a dynamic scene recognition and tracking module 528, an augmented video rendering module 530, and a social media module 532.

The context module 524 is configured to automatically select and/or recommend virtual 3D models from a local database (e.g., stored in the memory device 516) or an online store, based on context data. The context data may include any information related to a location or user. For example, FIG. 6 is a block diagram a data structure for context data 600 received by the context module 524 according to one embodiment. The context data 600 includes one or more data elements including location data 610, event data 612, current date 614, user profile 616, and user input 618. The location data 610 allows the context module to select or recommend a virtual 3D model based on the user's location. For example, virtual 3D models of historic people or objects may be automatically selected or suggested to the user based on the user's current location (e.g., as determined by a global position system (GPS) device or other location device of the augmented reality device 500). The event data 612 may correspond to, for example, a sporting event, music concert, business conference, or other event that the user may attend on the current date 614. The user profile 616 may include information about a user or the user's friends and family (e.g., birthdates, anniversaries, etc.), and user preferences such as favorite animals, favorite historic people or current celebrities, preferred virtual object genres, and preferred types of virtual interactions. The user input 618 may include a user selection of a current mood, virtual object, or interaction type.

As indicated above, the context module 524 automatically selects and/or recommends a virtual 3D model based on the context data 600. FIG. 7 is a block diagram of a virtual 3D model 700 according to one embodiment. The virtual 3D model 700 includes context data 710, target object data 712, interaction rules 714, and graphic object(s) 716. The context data 710 may include, for example, a location, event, date, genre, mood, or other contextual information associated with the graphic object(s) 716. The context module 524 compares the context data 600 received by the augmented reality device 500 with the context data 710 of the virtual 3D model 700 to determine whether the virtual 3D model 700 should be automatically selected and/or recommended to the user. The target object data 712 defines an object in the scene to interact with (e.g., a person, pet or other animal, building, vehicle, etc.). The interaction rules 714 define how the graphic object interacts with object indicated in the target object data 712. For example, if the target object data 712 indicates a person in a scene and the graphic object(s) 716 includes a virtual monkey, the interaction rules 714 may indicate that the virtual monkey should climb the person, then jump up and down on the person's head, followed by tickling the person's ear. The interaction rules 714 may also define responses by the virtual monkey to actions by the user, such as person's movements, speech, or mood.

The depth mapping module 526 is configured to receive depth information from the 3D video camera 514 and to generate a 3D map of the user's environment. The dynamic scene recognition and mapping module 528 uses the target object data 712 to detect and track objects in the 3D map. The augmented video rendering module 530 applies the interaction rules 714 to the 3D map to render an augmented video of the graphic objects dynamically interacting with the detected and tracked object in the scene. In certain embodiments, the social media module 532 is configured to, automatically or in response to user input, provide the augmented video to an online video-sharing service and/or social media service for sharing with the user's friends and/or family.

Figure 8:
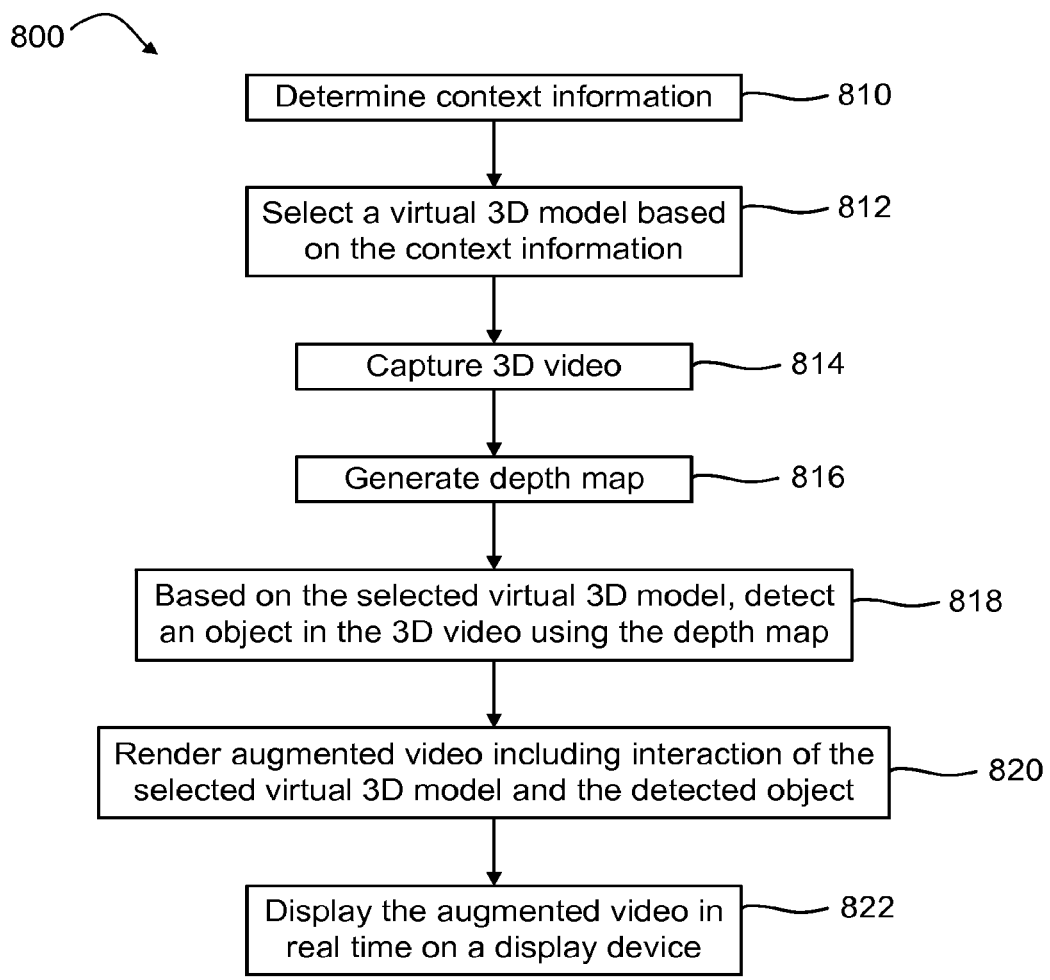
FIG. 8 is a flow chart of a method for rendering augmented video according to one embodiment.

FIG. 8 is a flow chart of a method 800 for rendering augmented video according to one embodiment. The method 800 includes determining 810 context information, selecting 812 a virtual 3D model based on the context information, capturing 814 3D video, and generating 816 a depth map using depth information from the 3D video. Based on the selected virtual 3D model, the method 800 also includes detecting 818 an object in the 3D video using the depth map. The method 800 further includes rendering 820 augmented video including interaction of the selected virtual 3D model and the detected object, and displaying 822 the augmented video in real time on a display device. Although not shown in FIG. 8, the method 800 may also include delivering, either automatically or in response to a user request, the augmented video to a mobile video sharing service.

In certain embodiments, the method 800 does not require any training stage or binding of a virtual 3D model to the detection and tracking of a 2D or 3D object. The type of potential augmentation may be suggested to the user based on the user's location, mood, and/or profile. Once the type of augmentation is chosen, the rendering of the augmentation into the reality is driven by the people and the objects in the scene (e.g., within the field of view of the 3D video capture device). The augmented virtual 3D objects interact with the physical objects in the scene in a natural way. For example, if the person waves his hands, a virtual birds follows his hands, a virtual monkey climbs on to the shoulder of a person and interacts with the person as it would in real life.

EXAMPLES

The following are examples of further embodiments. Examples may include subject matter such as a method, means for perming acts of the method, at least one machine-readable medium including instructions that, when performed by a machine cause the machine to perform acts of the method, or of an apparatus or system for rendering augmented video according to the embodiments and examples described herein.

Example 1 is an augmented reality device. The augmented reality device includes a three-dimensional (3D) video camera to capture video data comprising video images and corresponding depth information, a display device to display the video data, and an augmented reality module to add a virtual 3D model to the displayed video data. The augmented reality module a depth mapping module to generate a 3D map based on the depth information, a dynamic scene recognition and tracking module to process the video images and the 3D map to detect and track a target object within a field of view of the 3D video camera, and an augmented video rendering module to render an augmented video of the virtual 3D model dynamically interacting with the target object. The augmented video rendering module also provides the augmented video for display on the display device.

Example 2 includes the subject matter of Example 1, and further includes a context module to select the virtual 3D model based on context data comprising a current location of the augmented reality device. The selected virtual 3D model is associated with the current location.

Example 3 includes the subject matter of Example 2, wherein the context data further comprises user profile information including one or more data field comprising birthdate, anniversary, animal preference, historic person preference, current celebrity preference, and genre preference.

Example 4 includes the subject matter of any of Examples 2-3, wherein the context module is further configured to select the virtual 3D model based on the user profile information.

Example 5 includes the subject matter of Examples 2-4, wherein the context module is further configured to select the virtual 3D model based on a mood indicator selected by a user.

Example 6 includes the subject matter of any of Examples 1-5, wherein the virtual 3D model includes context data to associate the virtual 3D model with at least one of a location, person, and event. The virtual 3D model may also include target object data associated with the context data, the target object data to define a specific object or object type for the dynamic scene recognition and tracking module to detect and track as the target object.

Example 7 includes the subject matter of Example 6, wherein the virtual 3D model further includes one or more graphic objects to animate in the rendered augmented video, and interaction rules to define an interaction between the one or more graphic objects and the target object in the rendered augmented video.

Example 8 includes the subject matter of any of Examples 1-7, and further includes a communication module to communicate through a communication network, and a social media module to, automatically or in response to user input, provide the augmented video through the communication network to a video-sharing service or social media service.

Example 9 is a method for rendering augmented video. The method includes capturing, by a mobile device, video data comprising video images and corresponding depth information. The method also includes generating a three-dimensional (3D) map based on the depth information, and detecting and tracking a target object in the video images. The method further includes rendering, based on the 3D map, an augmented video comprising a virtual 3D model dynamically interacting with the target object. The method may also include displaying the augmented video in real time on a display device of the mobile device.

Example 10 includes the subject matter of Example 9, wherein the method further includes determining context information including a location of the mobile device, and selecting the virtual 3D model based on the context information.

Example 11 includes the subject matter of Example 10, wherein the context information further includes a user profile comprising one or more data field including birthdate, anniversary, animal preference, historic person preference, current celebrity preference, and genre preference.

Example 12 includes the subject matter of Example 11, wherein the method further includes selecting the virtual 3D model based on the user profile.

Example 13 includes the subject matter of Example 11, wherein the context information further includes an indication of a user's mood, and wherein the method further comprises selecting the virtual 3D model based on the indication of the user's mood.

Example 14 includes the subject matter of any of Examples 9-13, wherein the virtual 3D model includes context data to associate the virtual 3D model with at least one of a location, person, and event. The virtual 3D model also includes target object data associated with the context data. The target object data defines a specific object or object type for the dynamic scene recognition and tracking module to detect and track as the target object.

Example 15 includes the subject matter of Example 14, wherein the virtual 3D model further includes one or more graphic objects to animate in the rendered augmented video, and interaction rules to define an interaction between the one or more graphic objects and the target object in the rendered augmented video.

Example 16 includes the subject matter of any of Examples 9-15, wherein the augmented video comprises an augmented micro video, and wherein the method further includes automatically communicating the augmented micro video through a communication network to at least one of a video-sharing service and a social media service.

Example 17 is at least one computer-readable storage medium having stored thereon instructions that, when executed by a processor, cause the processor to perform the method of any of Examples 9-16.

Example 18 is an apparatus comprising means to perform a method as in any of Examples 9-16.

Example 19 is at least one computer-readable storage medium having stored thereon instructions that, when executed by a processor, cause the processor to perform operations comprising: capturing, by an augmented reality device, video data comprising video images and corresponding depth information; generating a three-dimensional (3D) map based on the depth information; detecting and tracking a target object in the video images; rendering, based on the 3D map, an augmented video comprising a virtual 3D model dynamically interacting with the target object; and displaying the augmented video in real time on a display device of the augmented reality device.

Example 20 includes the subject matter of Example 19, the operations further comprising: determining context information including a location of the augmented reality device; and selecting the virtual 3D model based on the context information.

Example 21 includes the subject matter of Example 20, wherein the context information further includes a user profile comprising one or more data field including birthdate, anniversary, animal preference, historic person preference, current celebrity preference, and genre preference.

Example 22 includes the subject matter of any of Examples 20-21, and wherein the operations further comprise selecting the virtual 3D model based on the user profile.

Example 23 includes the subject matter of any of Examples 19-22, wherein the context information further includes an indication of a user's mood, and wherein the operations further comprise selecting the virtual 3D model based on the indication of the user's mood.

Example 24 includes the subject matter of any of Examples 19-23, wherein the virtual 3D model comprises: context data to associate the virtual 3D model with at least one of a location, person, and event; and target object data associated with the context data, the target object data to define a specific object or object type for the dynamic scene recognition and tracking module to detect and track as the target object.

Example 25 includes the subject matter of Example 24, wherein the virtual 3D model further comprises: one or more graphic objects to animate in the rendered augmented video; and interaction rules to define an interaction between the one or more graphic objects and the target object in the rendered augmented video.

Example 26 includes the subject matter of any of Examples 19-25, wherein the augmented video comprises an augmented micro video, and wherein the operations further comprise automatically communicating the augmented micro video through a communication network to at least one of a video-sharing service and a social media service.

Example 27 is an apparatus including means for capturing video data comprising video images and corresponding depth information, and means for adding a virtual 3D model to the displayed video data. The means for adding the virtual 3D model includes means for generating a 3D map based on the depth information, means for detecting and tracking a target object within a field of view of the means for capturing video data, and means for rendering an augmented video of the virtual 3D model dynamically interacting with the target object. The apparatus further includes means for displaying the augmented video in real time.

Example 28 includes the subject matter of Example 27, and further includes means for selecting the virtual 3D model based on context data comprising a current location of the augmented reality device, wherein the selected virtual 3D model is associated with the current location.

Example 29 includes the subject matter of Example 28, wherein the context data further includes user profile information including one or more data field comprising birthdate, anniversary, animal preference, historic person preference, current celebrity preference, and genre preference.

Example 30 includes the subject matter of any of Examples 27-29, and further includes means for selecting the virtual 3D model based on the user profile information.

Example 31 includes the subject matter of any of Examples 27-30, and further includes means for selecting the virtual 3D model based on a mood indicator selected by a user.

Example 32 includes the subject matter of any of Examples 27-31, wherein the virtual 3D model includes context data to associate the virtual 3D model with at least one of a location, person, and event. The virtual 3D model further includes target object data associated with the context data. The target object data defines a specific object or object type for the dynamic scene recognition and tracking module to detect and track as the target object.

Example 33 includes the subject matter of Example 32, wherein the virtual 3D model further includes one or more graphic objects to animate in the rendered augmented video, and interaction rules to define an interaction between the one or more graphic objects and the target object in the rendered augmented video.

Example 34 includes the subject matter of any of Examples 27-33, and further includes means for communicating through a communication network, and means for, automatically or in response to user input, providing the augmented video through the communication network to a video-sharing service or social media service.

The above description provides numerous specific details for a thorough understanding of the embodiments described herein. However, those of skill in the art will recognize that one or more of the specific details may be omitted, or other methods, components, or materials may be used. In some cases, well-known features, structures, or operations are not shown or described in detail.

Furthermore, the described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that performs one or more tasks or implements particular abstract data types. In certain embodiments, the described functions of all or a portion of a software module (or simply "module") may be implemented using circuitry.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the invention. The scope of the present invention should, therefore, be determined only by the following claims.

The invention claimed is:

1. An augmented reality device, comprising:
   memory to store video data comprising video images; and
   a processor to add a virtual three dimensional (3D) model to the video data, the processor comprising instructions to:
   generate a 3D map based on depth information corresponding to the video data;
   process the video images and the 3D map to detect and track one or more physical target objects in the video images;
   select the virtual 3D model based at least in part on a user's mood; and
   render an augmented video of the virtual 3D model and the one or more physical target objects, the rendered augmented video showing the virtual 3D model performing a first interaction between the virtual 3D model and the one or more physical target objects, detect from the video images a change in a makeup of the one or more physical target objects, and
   dynamically adjust the virtual 3D model to perform a second interaction between the virtual 3D model and the one or more physical target objects, according to the detected change in the makeup of the one or more physical target objects, the first and second interactions being different kinds of interactions.

2. The augmented reality device of claim 1, wherein the virtual 3D model further comprises an animation of a graphic object of the 3D model, and wherein the first and second interactions use first and second different animations of the graphic object.

3. The augmented reality device of claim 2, wherein a size of the first or second animation in the augmented video is dynamically adjusted according to a change of depth of one or more of the one or more physical target objects from one frame of the video data to another subsequent frame of the video data.

4. The augmented reality device of claim 2, wherein a location of the animation in the augmented video is dynamically adjusted according to a change of depth of one or more of the one or more physical target objects from one frame of the video data to another subsequent frame of the video data.

5. The augmented reality device of claim 1, wherein the virtual 3D model comprises target object data to define the one or more physical target objects for the processor to detect and track.

6. The augmented reality device of claim 1, wherein the processor further comprises instructions to provide the augmented video through a communication network to an online service.

7. The augmented reality device of claim 1, wherein a change in a makeup of the one or more physical target objects comprises a change in a number of the one or more physical target objects.

8. At least one non-transitory computer-readable storage medium having stored thereon instructions that, when executed by a processor, cause the processor to perform operations comprising:
   detecting and tracking a first makeup of one or more physical target objects and subsequently, a second makeup of one or more physical target objects in video data comprising video images;
   selecting a virtual three-dimensional (3D) model based at least in part on a user's mood;
   rendering, based on a 3D map corresponding to depth information associated with the video data, an augmented video showing in a first frame the virtual 3D model performing a first interaction with the first makeup of one or more physical target objects located in the first frame, and showing in a second subsequent frame the virtual 3D model performing a second interaction, different from the first interaction, with the second makeup of one or more physical target objects located in the second subsequent frame, wherein a change between the first interaction and the second interaction from the first frame to the second frame is based on a change detected between the first makeup of one or more physical target objects and the second makeup of one or more physical target objects from the image data of the first frame and the second frame; and
   displaying the augmented video.

9. The at least one non-transitory computer-readable storage medium of claim 8, wherein the virtual 3D model further comprises a first animation of a graphic object of the 3D model and a second animation of the graphic object of the 3D model, the first and second animations being different animations of the graphic object of the 3D model, and wherein the first interaction uses the first animation and the second interaction uses the second animation.

10. The at least one non-transitory computer-readable storage medium of claim 9, wherein a size of the first animation in the first frame of the augmented video during the first interaction is different than a size of the second animation in the second frame of the augmented video during the second interaction, according to the difference between the first makeup of one or more physical target objects in the first frame and the second makeup of one or more physical target objects in the second frame.

11. The at least one non-transitory computer-readable storage medium of claim 9, wherein a first location in the first frame of the augmented video of the first animation of the graphic object during the first interaction is different than a second location in the second frame of the augmented video of the second animation of the graphic object during the second interaction according to a difference between the first makeup of one or more physical target objects in the first frame and the second makeup of one or more physical target objects in the second frame.

12. The at least one non-transitory computer-readable storage medium of claim 8, wherein the virtual 3D model comprises target object data to define the first and second makeups of one or more physical target objects for the processor to detect and track.

13. The at least one non-transitory computer-readable storage medium of claim 8, further comprising instructions that cause the processor to provide the augmented video through a communication network to an online service.

14. The at least one non-transitory computer-readable storage medium of claim 8, wherein displaying the augmented video occurs in real time.

15. A method for rendering augmented video, the method comprising:
 detecting and tracking one or more physical target objects in video data comprising video images;
 generating a 3D map based on depth information corresponding to the video data;
 selecting a virtual three-dimensional (3D) model based at least in part on a user's mood;
 rendering, based on the 3D map, an augmented video of the virtual 3D model and the one or more physical target objects, the rendered augmented video showing the virtual 3D model performing a first interaction between the virtual 3D model and the one or more physical target objects, the interaction using an animation of a graphic object of the virtual 3D model,
 detecting from the video data a change in a makeup of the one or more physical target objects,
 dynamically adjusting by the virtual 3D model, the first interaction to a second interaction with the one or more physical target objects when the makeup of the one or more physical target objects, through the video data, is detected to have changes from one frame of the rendered augmented video to another subsequent frame of the rendered augmented video; and
 displaying the augmented video on a display device.

16. The method of claim 15, wherein a size of the animation in the augmented video is dynamically adjusted according to the change detected in the makeup of the one or more physical target objects from one frame of the rendered augmented video to another subsequent frame of the rendered augmented video.

17. The method of claim 15, wherein a location of the animation in the augmented video is dynamically adjusted according to the change detected in the makeup of the one or more physical target objects from one frame of the rendered augmented video to another subsequent frame of the rendered augmented video.

18. The method of claim 15, wherein the virtual 3D model comprises target object data to define the one or more physical target objects to detect and track.

19. The method of claim 15, further comprising providing the augmented video through a communication network to an online service.

20. The method of claim 15, wherein displaying the augmented video on the display device occurs in real time.

* * * * *